Nov. 26, 1957 E. M. S. McWHIRTER ET AL 2,814,440

MEMORY SYSTEM

Filed Sept. 4, 1952 4 Sheets-Sheet 1

INVENTORS
E. M. S. McWHIRTER
F. W. WARDEN
BY

Robert Harding Jr.
ATTORNEY

INVENTORS
E. M. S. McWHIRTER
F. W. WARDEN
BY
Robert Harding Jr.
ATTORNEY

INVENTORS
E. M. S. McWHIRTER
F. W. WARDEN
BY
Robert Harding Jr.
ATTORNEY

INVENTORS
E. M. S. McWHIRTER
F. W. WARDEN
BY
Robert Harding Jr.
ATTORNEY 2,814,440
Patented Nov. 26, 1957

2,814,440

MEMORY SYSTEM

Eric M. S. McWhirter and Frederick W. Warden, London, England, assignors to International Standard Electric Corporation, New York, N. Y., a corporation of Delaware Application September 4, 1952, Serial No. 307,786

20 Claims. (Cl. 235—61.11)

This invention relates to memory systems of the type in which a large library of items of information can be stored for future use, and the term "memory system" is intended to include the equipment necessary for storing the items as well as that used for selecting and reading the stored items.

In the development of equipment to handle the repetitive clerical work of many industries, a requirement arises for a memory device in which a large library of items of information can be stored. Such libraries might involve many hundreds of thousands of items, or even millions. Examples of such libraries would include inventories of factories, warehouses, and department stores; credit accounts for large stores; depositors' and loan accounts for banks; reservations for transportation; payrolls of large organizations; and many others.

The operation of businesses where such files are kept usually involves reference to these files in two dissimilar patterns: serial interrogation, in which the file is run through from beginning to end to print out certain records of large numbers of the items, for example, printing out weekly, monthly, or periodic accounts, printing out payroll earnings, etc.; and random interrogation, in which a particular or a few items have to be selected for examination or removal, or new ones have to be added, which may occur, for example, in the day-to-day changes of business.

Electronic techniques have been developed whereby information items may be written on magnetic wires, tapes, or drums at tremendous speeds and read therefrom at similar speeds.

The use of magnetic wires and tapes, however, present a problem, because many reels, each carrying over a thousand feet of wire or tape are necessary and, although these can be run at high speed for entering or reading off sequential items in connection with serial interrogation, they are too slow and cumbersome for providing the information for an individual or random inquiry to the files.

Magnetic drums, while they solve the random access problem, are many times more expensive and bulky than tape storage devices and are economically not feasible.

It is therefore one of the objects of the present invention to provide a memory system in which serial interrogation and random interrogation of a large library of information items may be carried on at suitable speeds for industrial systems without the problems of changing tape records manually or the expensive manufacturing and maintenance problems of recording drums.

Another object of the invention is to provide a memory system using card records in which a random interrogation may be made in a faster time than can be obtained with any card systems now in use.

Another object of the invention is to provide a memory system having such flexibility that the number of items may be expanded or contracted at will, or individual items added or removed without interfering with the operation of the system.

Still another object of the invention is to provide a memory system in which the time required for an interrogation will depend solely on a much smaller number of items which have to be examined than with tape methods.

A feature of the invention is the provision of a memory system in which the items of information are stored on cards which are arranged in stacks, and mechanism is provided which will automatically remove a stack of cards from a tray or drawer upon which it is positioned when the tray or drawer is moved into a recess provided for it in the mechanism, will subject the cards in succession to a record transfer operation to obtain the information recorded on the cards or to record information on the cards, or both, and will stack the cards again upon the tray or drawer.

A further feature of the invention is the provision of a cabinet in which a plurality of trays or drawers are stored, each tray or drawer holding a stack of cards, automatic means being provided for selecting a desired one of the trays, automatically withdrawing the tray from the cabinet, removing the cards from the tray, subjecting the cards in succession to a record transfer operation, replacing the cards on said tray again, and returning the tray to the cabinet.

Information is placed on a card by passing it through a recording means and information is obtained from a card by passing it through a reading means. Both of these means transfer records, and the term "record transfer means," as used in the claims, is intended to mean either a reading means or a recording means, or both.

The invention is illustrated in the accompanying drawings in which Figure 1 is a side elevational view partly in section of a card removing and record transfer mechanism, showing the manner in which the cards are removed from the tray;

Figure 1:
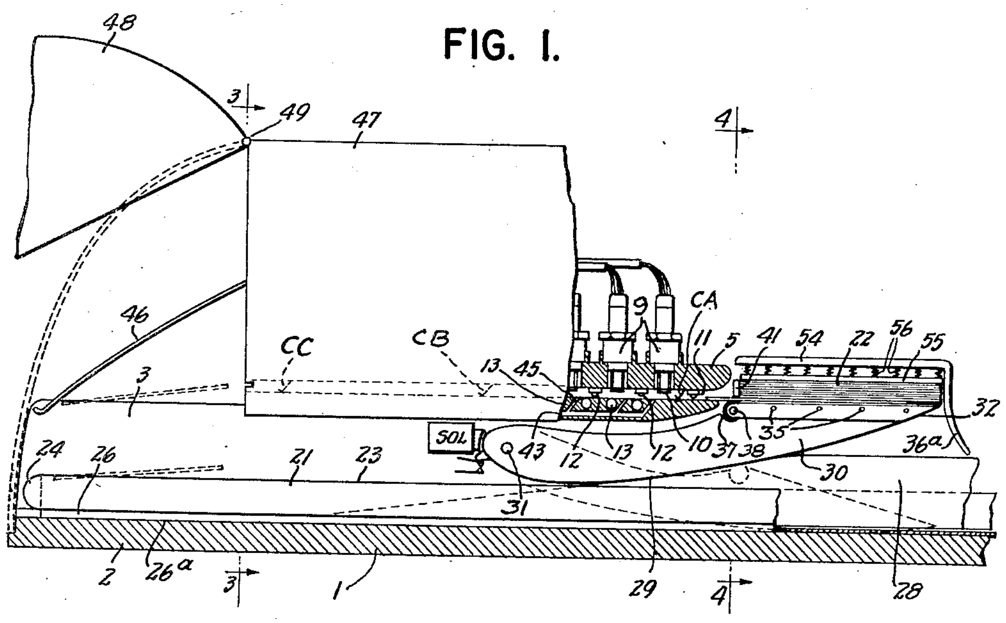

Referring now more specifically to Figures 1 to 5, the invention is shown as comprising a support 1 which may be channel-shaped, having a base 2 and side flanges 3 and 4, the flange 4 being spaced slightly from the side edge of the base for a purpose which will be explained later. The support 1 carries a reading head 5 and a recording head 6 of the type used to read and record information from cards, tapes, drums, etc. We prefer to use magnetic reading and recording heads for this purpose, and hence the heads illustrated in the drawing are of the magnetic type, having energizing coils 9 and magnetic cores 10 for magnetizing elemental areas of the surface of a card or being influenced magnetically by such elemental areas. Such magnetic reading and recording heads are well known in the art and form no part of the present invention. The heads 5 and 6 are mounted one in back of the other on the flanges 3 and 4 in any desired manner, the arrangement being such that cards passing through the device pass first through the reading head and then through the recording head.

Figure 2:
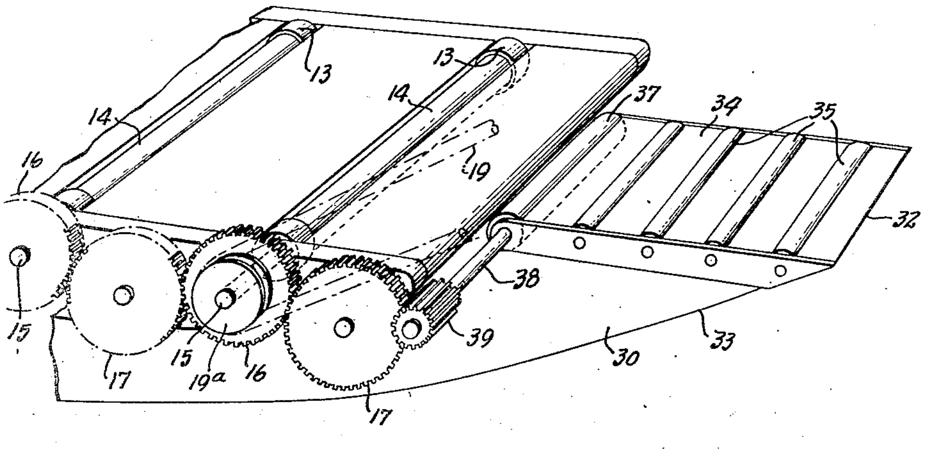
Figure 2 is a fragmentary view of the card lifting member shown in Figure 1, showing the mechanism for driving the cards through the record transfer mechanism.
Figure 3:
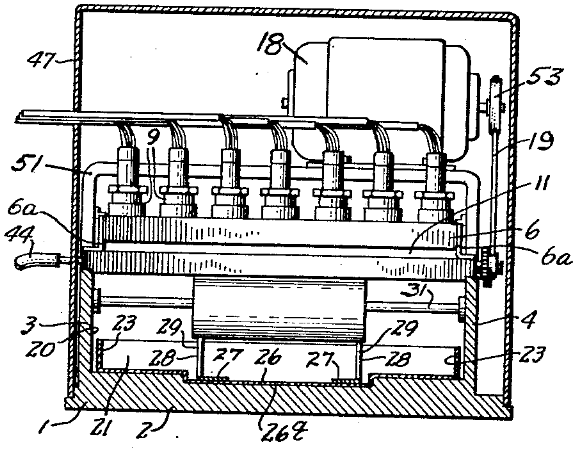
Figure 3 is a sectional end view, taken on the line 3—3 of Figure 1 and showing the manner in which the tray carrying the cards fits into the card removing mechanism.

Each of the heads 5 and 6 have separated upper and lower portions, the upper portions being supported by side angle pieces 6*a* (Fig. 3), and forming slots 11 between them through which cards are adapted to be passed, the electromagnets being mounted in the upper parts with the magnet cores terminating in a plane defined by the upper edge of the slot. Suitable rollers or ball bearings 12 are rotatably mounted in the upper portions of the heads and lie tangential to a plane spaced very slightly from the plane of the tips of the magnet cores, so that when the cards are maintained against the ball bearings they do not touch the magnet cores, thus preventing frictional engagement therewith while at the same time maintaining a very accurate spacing. A plurality of driving rollers 13, shown more clearly in Figure 2, are rotatably mounted in the lower portions of the heads for moving the cards through the heads. These rollers have reduced diameters at the central portion, as indicated at 14, so that the rollers engage the cards adjacent the side edges only thereof. The rollers are mounted in suitable recesses in the lower portions of the heads so that their upper surfaces are tangential to the plane aligned with the lower side of the slots 11. Shafts 15 upon which the rollers are mounted extend from the lower portions of the heads beyond the flange 4 of the support and are provided with gears 16 which mesh with alternate idler gears 17 rotatably mounted on the lower portions to form a gear train by means of which all the rollers 13 are driven simultaneously and at the same speed. One of the idler gears 17 is driven by a motor 18, supported in a manner to be later described, a belt 19 from the motor passing around a suitable pulley 19*a* attached to the shaft of the idler gear.

The base plate 2 of the support 1 and the side flanges 3 and 4 thereof beneath the heads 5 and 6 form a guide means 20 adapted to receive a tray or drawer 21 upon which is positioned a stack 22 of cards, which cards contain the items of information. The manner in which the information is arranged on the cards will be explained later.

The tray 21 may be made of thin light metal or any other desirable material having sides 23 at least as high as the stack of cards to be placed therein. The end of the tray which enters the reading mechanism is shown as made of a thickened member 24 being cut away at the center, forming an opening 25 in the end wall of the tray. The bottom of the tray is slightly recessed, as at 26, to align with the opening 25, so that the depth of the tray is slightly greater throughout this recess which extends into the tray for a distance at least equal to the front-to-back dimension of the cards. A longitudinal recess 26*a* in the upper surface of the base 2 cooperates with the recess 26 when a tray is inserted in the guide 20 and further aids in guiding the tray.

A pair of thin metal strips 27 are mounted on the bottom of the tray 21 and are spaced apart so that they lie within the cut-away portion 25 of the front edge of the tray and extend longitudinally of the tray. The stack 22 of cards is adapted to rest on this portion of the tray, the recess 26 forming a slight clearance between the bottom of the lowermost card and the surface of the recess. The strips 27 extend as flat strips longitudinally of the tray a distance a little less than the length of the cards and thereafter are provided with outer upstanding flanges 28 which rise gradually, forming cam surfaces 29 which will be later discussed.

A stack lifting member 30 is provided in the guide 20 and is pivotally mounted by means of a shaft 31 between the side flanges 3 and 4 of the support 1 at a position above the upper edge of the tray when the tray is inserted in the guide. This stack lifting member 30 is slightly narrower than the cut-out portion 25 of the front end of the tray and is tapered at its other end to form an edge 32 which is adapted to be inserted beneath a stack 22 of cards when a tray 21 containing the cards is inserted into the guide means. In order to insure such insertion the lower surface 33 of the member 30 is curved, so that a portion of this surface will normally rest on the base 2 and keep the edge 32 high enough to slip between the stack 22 and the surface of the recess 26 in a tray. Adjacent the edge 32 the member 30 is provided with a flat upper surface 34 upon which the stack of cards rests when it is slid up on the member 30. This flat surface is provided with a plurality of idler rollers 35 which are embedded and rotatably mounted in any suitable manner in recesses provided for that purpose in the member 30. The rollers permit the stack of cards to slide up onto the surface 34 as a tray 21 is inserted in the guide means 20. Stops 36 are provided at each side of the tray 21 in back of the stack of cards to prevent the cards moving rearwardly of the tray as the tray is introduced into the guide means 20 and the edge 32 passes underneath the stack.

As the tray continues its movement into the guide means 20 the lower surface 33 of the stack lifting member 30 will slide upon the strips 27 and will engage the cam surfaces 29 on the strips to pivot the member 30 about the shaft 31, so that the surface 34 is raised higher and higher within the device. The curvature of the lower surface 33 of the member 30 and the curvature of the cam surfaces 29 on the strips 27 are such that the flat surface 34 is raised to a position where it will approximately align itself with the slot 11 in the reading head 5 when the tray 21 is in its innermost position in the guide means 20. The surface 34 is so arranged that it is parallel with the plane of the reading head cores 10 when the member 30 is in its uppermost position.

Because there may be variations in tray dimensions, we prefer not to depend on the cam surfaces 29 for accurately positioning the member 30 for feeding the cards into the reading head. In order more accurately to control the upper position of the member 30 we provide a solenoid SOL mounted under the recording head 6 which is arranged when energized to attract a portion of the surface of the member 30. The shape of this portion is such that when it is adjacent the core of the solenoid, the member 30 is accurately positioned. A pair of contacts LC (see Fig. 9) are mounted so as to be engaged by the member 30 in such a manner that the contacts close when the member 30 approaches its uppermost position and remain closed as long as the member remains in its uppermost position.

A roller 37 similar to the roller 35 but adjacent the forward edge of the lowermost card when a stack of cards is resting upon the surface 34, is positioned so as to engage the front edge of the lowermost card, and this roller is provided with a shaft 38 which extends out at the side of the member 30 and terminates in a gear 39 which in the normal position of the member 30 is not used. A suitable slot 40 is provided in the flange 4 to permit bodily movement of the shaft 38. When the member 30 is raised to its uppermost position, the gear 39 meshes with one of the idler gears 17, as clearly shown in Figure 2. Since the gear 17 is driven, as has been explained above, the meshing with the gear 17 will cause the gear 39 to be driven and thus will drive the roller 37 to cause the lowermost card in the stack to move into the slot 11 where it will be engaged by the first roller 13, which, together with the other successive rollers in the head, will cause the card to move on through the reading head and in a similar manner through the recording head. A suitable stop 41 is provided attached to the reading head adjacent the opening of the slot 11 to prevent the card above the lowermost card from moving towards the reading head as the lowermost card is being removed from the stack. The opening of the slot 11 is preferably curved to guide the card as it enters the slot.

All of the drive rollers may be surfaced with rubber or other material which will provide a good frictional grip on the card.

The lowermost portion of both the reading head and the recording head is provided with a duct 43 having an outside connection 44 which may be supplied with air under pressure. The duct 43 has a plurality of angular ducts 45 leading upwardly into the space of the slot 11, so as to cause air under pressure to be forced against the lower surface of a card passing through the head to maintain the central surface of the card against the ball bearings 12 and thus maintain an accurate spacing of the magnetic surface of the card with respect to the tips of the magnetic cores 10. The air stream also provides a means to maintain the surfaces in the reading and recording heads clear of dust to prevent any distortion of the signal from this cause. The width of the slots 11 is determined by the spacing between the upright walls of angle pieces 6*a*, the distance between said walls being substantially equal to the inside width of tray 21. The angle pieces 6*a* thus serve to guide the cards 22 in a straight line with respect to the reading and recording heads.

The tray 21 is manually or automatically pushed along the guide 20 until it extends beyond the end of the recording head a distance slightly greater than the length of a card when the tray is in position for the cards to be read. The tray is shown in its extended position in Fig. 1. A guide plate 46 is provided above the outlet of the recording head slot 11, so that a card leaving the recording head will strike the guide plate and fall down into position upon the forward end of the tray 21, in exactly the same position as it was before the tray was introduced into the reading mechanism. It will be observed that each card is returned to the same relative position in the stack which it occupied at the outset.

A housing 47 is provided to cover the reading and recording mechanism and is arranged to be attached to the flanges 3 and 4 of the support 1. This housing is provided at the outlet end with a hood 48 attached to the top of the housing by a hinge 49, the hood 48 being so shaped that it will cover the guide plate 46 and the end of the tray 27 when the tray is in position.

Figure 4:
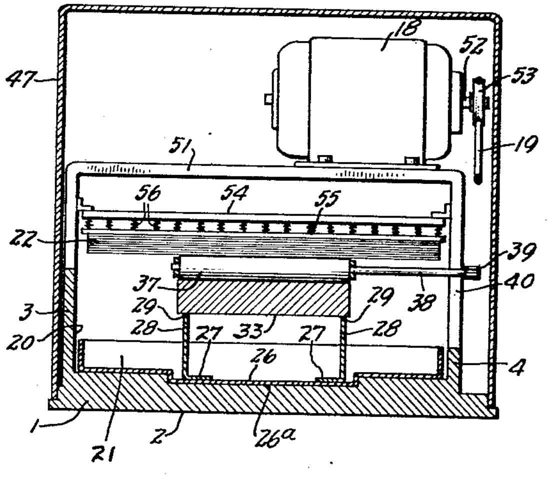
Figure 4 is a similar sectional end view, taken on the line 4—4 of Figure 1.
Figure 5:
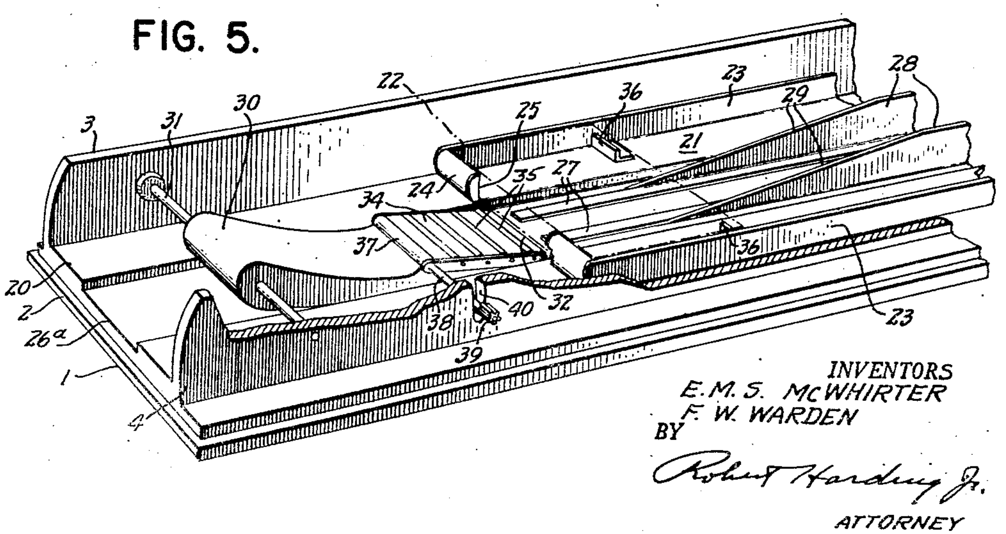
Figure 5 is a perspective view of the card lifting member, showing its relation to other parts.

The rollers 13 and 37 are driven by means of the motor 18 which is mounted on a bracket 51 attached in any suitable manner to the side flanges 3 and 4 of the support 1. This bracket is above the stack of cards 22 when the stack is in its uppermost feeding position as shown in Figures 1 and 4, and the mother shaft 52 is provided with a pulley 53 which engages the belt 19.

The bracket 51 also holds a plate 54 which is slightly larger than one of the cards. The plate 54 is supported in any desirable manner beneath the bracket 51 and has attached beneath it another plate 55 which is adapted to rest upon the uppermost card of the stack. The plate 55 is movably mounted with respect to the plate 54 and is urged downwardly by means of light springs 56. Alternatively the springs might be eliminated and the weight of the plate 55 made sufficient to accomplish the same purpose, which is to press downwardly upon the stack of cards, so that when the lowermost card has been removed, the whole stack will move downwardly in order for the next card to engage the drive roller 37. Suitable stops (not shown) are provided to prevent the plate 55 from moving below the plane of the lowermost card when there are no cards present.

A curved guide member 36*a* is attached to the plate 54 and acts to straighten the stack of cards if they should be displaced in the act of picking them up.

Figure 6:
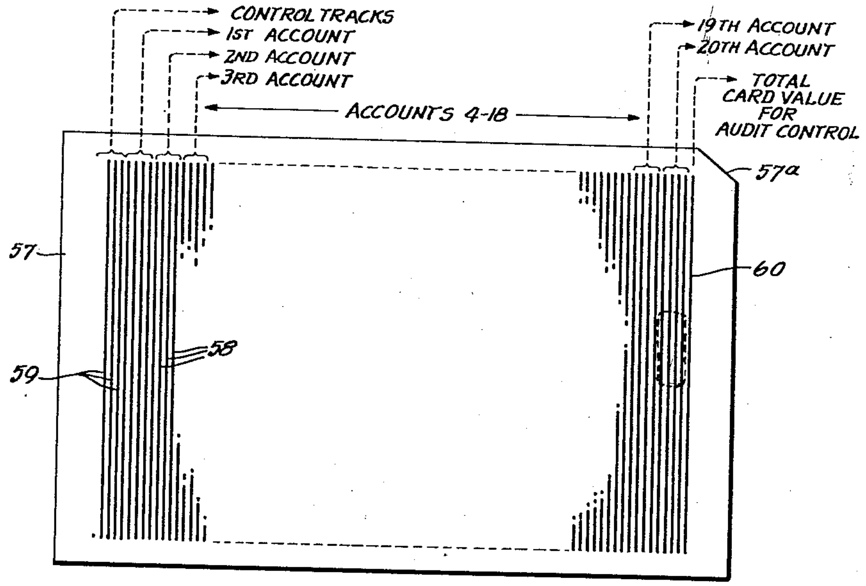
Figure 6 is a plan view of a card which may be used with the invention.
Figure 7:
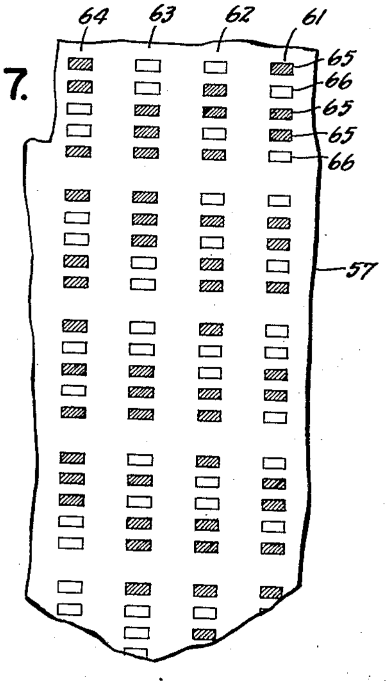
Figure 7 is an enlarged plan view of a portion of the card shown in Figure 6.

Various types of cards may be used with the invention and the items of information may be recorded on the cards in various ways. However, we prefer to use magnetic recording, as has already been stated, and therefore we use a card having a magnetizable surface. Such a card 57 is illustrated in Figures 6 and 7.

In the great majority of cases, items of information to be stored in libraries comprise similar types of information for each item. These usually include:

An identity of the item: either a name and address or a stock number or an account number;

A reference for the item: credit reference, or an employer's name, or a medical history, or a classification;

A quantity: either an amount of money belonging or owing or earned, or copies of magazines, or a number of goods;

A time factor: a period of earning, or a payment date, or an end-of-month or period statement, or an inventory check date.

Other factors may be included, but all can be expressed in the simple modified form of letters or figures in various combinations commonly in use at present in describing these items by the present written methods.

Where the card is used, for instance, by a bank for keeping records of loan accounts, each account may include four items of information: the name of the person whose account is to be kept, his address, payments made, and an item which includes an account number, number of payments, balance, and other necessary notations. For this purpose a group of four tracks can be used on the card, and, since it is possible to have a large number of tracks on the magnetic surface of the card, a number of accounts may be entered on one card. The card 57, shown in Figure 6, is five inches from front-to-back and is eight inches wide. It has eighty-four tracks 58 extending parallel to the five inch side with a margin of one half inch all around the card. The tracks are arranged in groups of four, except for the first three tracks 59 on the left side and one track 60 on the right side. The three tracks 59 may be used for controlling the operation of the mechanism, while track 60 may be used for indicating a total card value for the purpose of audit control. This leaves eighty tracks available for twenty separate accounts.

We prefer to record the information on the tracks in a plurality of trains of elements, each train representing a code. Any number of elements may be used in the code; we propose using five or seven. In Figure 7 an enlarged portion of four tracks is shown with the code trains indicated. This portion is outlined in dotted lines in Figure 6 and represents one account. The individual tracks of this enlarged portion are indicated at 61, 62, 63, and 64. In track 61 may be seen a sequence of groups of elements, there being five elements in each group, these elements corresponding to the "mark" and "space" elements of a five-element telegraph code. When the elemental area of the track is magnetized with one polarity, a mark element may be produced, as indicated at 65. When an elemental area is magnetized with the opposite polarity, as indicated at 66, the element is represented as a space element. Thus, the first train at the upper end of the track 61 represents mark, space, mark, mark, space, while the second train represents a code of space, mark, mark, space, mark. It will be evident that these combinations of mark and space in each train may be arranged to represent a letter or a number in accordance with well known practice. In this manner the first track 61 may have recorded upon it the address of the person whose account is recorded, the second track 62 may have the name of the person recorded thereon; the third track 63 may have a record of payments made; and the fourth track 64 may have the record of the balance and other necessary information.

In some instances we may prefer to reserve the first half inch of all the tracks for an identification code, so that the reading circuit may be informed of the identification of the account on a card before the rest of the information is received.

We also prefer to cut off one corner of the card, as indicated at 57*a*, to aid in arranging the cards properly in the stack and also for the purpose of operating the control circuit, in a manner to be described.

It will be seen that the tracks on the card are close together and hence the magnetic cores in the reading head must be arranged to be similarly positioned laterally of the card. Because of the physical size of the coils, it is not possible to place all the magnetic reading cores in a straight line across the reading head, and to overcome this difficulty, we provide staggered rows of the coils in separate units with the magnet cores of each row molded in an individual unit. The first unit will contain the cores for tracks 1, 4, 7, 10, 13, etc.; the next unit will contain cores for tracks 2, 5, 8, 11, 14, etc.; and the next unit, the cores for tracks 3, 6, 9, 12, 15, etc. The speed of the card through the reading and recording heads may be fairly high; in the neighborhood of fifty inches per second. Thus, a five inch card will pass through the reading head and through the recording head in one fifth of a second, and the cards are therefore passed through the device at five cards per second.

Since the movement of the cards through the heads depends on friction between the cards and the drive rollers, it is necessary to inform the reading and recording circuits of the precise moments when reading or recording is to take place, and this can be done by the recorded elements on one of the first three tracks 59, which elements are aligned with the other elements across the card and can thus be used for synchronizing the operation of the circuits.

Since the magnetized elemental areas of the card are magnetized in either one polarity to represent a mark element or the opposite polarity to represent a space element, it is a simple matter to change the recording without first erasing what has been put on the card. If it is necessary to change a mark element into a space element, it is only necessary to reverse the polarity in the recording head, while if no change is necessary in the elemental area, the recording head would remain inoperative.

The arrangement thus far described provides a reading and recording device into which a tray containing a stack of cards may be introduced in any suitable manner, as for instance, manually. The stack of cards will be lifted from the tray, passed in succession through the reading and recording heads, and deposited again on the tray, whereupon the tray may be removed from the device. It is possible however, to provide a number of trays, each with its stack of cards, and to select a particular tray automatically, introduce it automatically into the device, and automatically return it again after the cards have been read.

Figure 8:
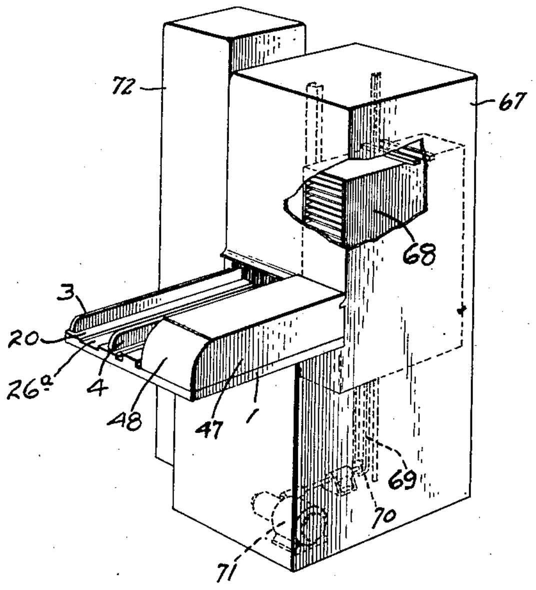
Figure 8 is a perspective view of a card storing cabinet which may be used with the invention.

To this end we prefer to use an apparatus similar to that disclosed in our U. S. Patent No. 2,604,530, issued July 22, 1952. This apparatus is indicated in Figure 8 and comprises a cabinet 67 which houses a plurality of the trays 21 arranged one above the other on an elevator 68 which can be raised and lowered at will by means of a chain 69 passing over upper and lower pulleys 70 and driven by a motor 71. A platform is provided as an extension in front of the cabinet, and circuits are provided in a housing 72 for selecting a desired tray in the cabinet, operating the motor 71 to raise or lower the elevator 68 until said tray is at the level of the platform, and causing the tray to move out onto the platform.

The reading and recording device shown in Figures 1–5 may be mounted upon the platform, or the support 1 may itself form the platform, as indicated in Figure 8. Thus, as the tray is forced out of the cabinet 67, it will pass into the guide means 20 of the support 1, so that operations will then take place as already described. With this arrangement therefore, it is possible automatically to choose a particular cabinet from among a plurality of cabinets, automatically to select a given tray in the chosen cabinet, automatically to shift the position of the tray to align itself with the card reading device on the platform, automatically to force the tray out of the cabinet and into the card reading device, thus simultaneously lifting the stack of cards from the tray, reading them in succession or recording on them, as desired, and stacking the cards again in the same order in the same position on the tray, and then automatically to return the tray to the cabinet.

Figure 9:
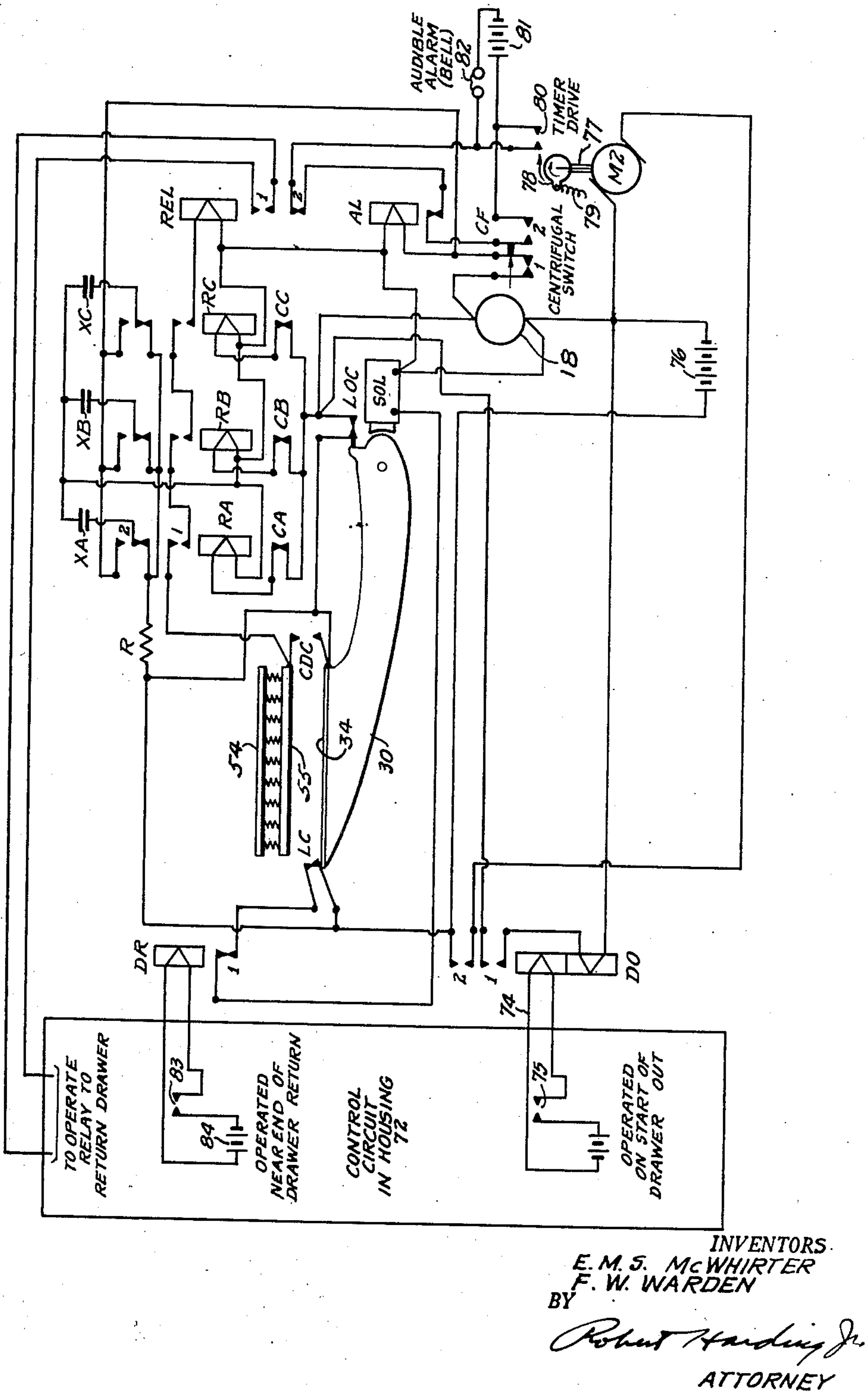
Figure 9 is a circuit diagram showing the controlling circuit for the operation of the card selecting and reading apparatus.

In Figure 9 is shown a diagram of a circuit adapted to control the apparatus for lifting the cards from the tray and passing them in succession through the reading and recording heads. This diagram shows schematically the stack lifting member 30 and the driving motor 18 which feeds the cards through the reading and recording devices. The solenoid SOL against which a portion of the member 30 is arranged to lie when the card holding surface 34 is in the proper position is also shown, as are the contacts LC which are positioned so as to be closed when the member 30 nears its uppermost position. These contacts will control the solenoid SOL in a manner to be later described, so that the solenoid will take over the control of the member 30 and raise it to the proper position.

We also provide a pair of contacts CDC, one connected to the surface 34 and the other connected to the plate 55, the arrangement being such that the contacts are closed when the member 30 is in the uppermost position and there are no cards on the surface 34, but as long as there is at least one card on this surface the contacts CDC will be open. We also provide three additional sets of contacts CA, CB, and CC arranged in the slots 11 of the reading and recording heads, as indicated in Figure 1, for use in controlling an alarm circuit in a manner to be later described.

A relay DO has its upper, energizing winding connected over wires 74 to the control circuit of the tray ejecting mechanism which is located in the housing 72. This circuit is connected through a switch 75 to a suitable source of potential, and the arrangement is such that whenever a drawer has been selected and starts to move out of the cabinet 67, the switch 75 is closed and the relay DO is energized. When the relay DO is energized, a circuit is closed from the positive side of the battery 76, over make contacts 2 of relay DO, through the slowly rotatable timing motor M2 to the negative side of battery 76. The motor M2 has a shaft 77 connected to it upon which is mounted a cam 78 normally held in a predetermined position by a spring 79. The cam 78 is adapted to engage switch contacts 80 after it has travelled through a certain angular distance for the purpose of sounding an alarm when a certain period of time has elapsed without the cards having been passed through the reading and recording heads and the tray returned to the cabinet. One of the contacts 80 is connected to one side of a suitable source of potential 81, while the other side of this source 81 is connected through an electric bell 82 or other audible or visible signal to the other of said contacts 80. The motor M2 rotates slowly when energized and starts the cam 78 rotating towards the contacts 80. After the motor M2 is de-energized the spring 79 will rotate the motor in the reverse direction and return the cam to its normal position.

When the member 30 rises sufficiently to close the contacts LC, a circuit is completed from the positive terminal of the battery 76, through the contacts LC, through contact 1 of the relay DR, through the winding of the solenoid SOL, to the negative terminal of the battery. The solenoid SOL is thus energized and raises the member 30 into its proper position, as referred to above.

The closing of the contacts LOC when the member 30 is in its uppermost position performs a number of functions: it starts the driving motor 18 over a circuit from the positive terminal of battery 76, contacts LOC, driving motor 18, to the negative terminal of the battery. It operates relays RA, RB and RC in parallel over contacts CA, CB and CC, respectively, one of each of these contacts leading to one terminal of the winding of the associated relay, while the other terminal of the winding leads to the negative side of the battery 76. It also operates relay AL over a circuit extending from the positive side of the battery 76, contacts LOC, contacts 1 of the centrifugal switch CF, winding of battery AL, to the negative terminal of the battery 76. The relay AL, at its only set of break contacts, opens a circuit which may also be used for closing the operating circuit for the alarm bell in a manner to be later described.

The operation of the LOC contacts also provides a locking path for the relay DO from the negative terminal of battery 76, the lower winding of the relay DO, make contact 1 of relay DO, contacts LOC, to the positive terminal of the battery 76.

The switch CF is a centrifugal switch controlled by the speed of the driving motor M1. When the motor is stationary or before it reaches a predetermined speed, contacts 1 of switch CF are closed, as shown, and contacts 2 are open. When the motor reaches this predetermined speed, contacts 1 open and contacts 2 close. The opening of contacts 2 would normally remove the energizing circuit from relay AL, but provision is made to maintain this relay energized as long as cards are passing through the device. Hence the closure of contacts 2 of the centrifugal switch CF cannot close the alarm bell circuit, because the break contacts of relay AL are open.

Three condensers XA, XB, and XC are arranged to be controlled respectively by relays RA, RB and RC. These condensers have one terminal each connected to the negative terminal of the battery 76, while the other terminal of each of these condensers is connected through break contact 2 of the respectively associated relays RA, RB, and RC to the positive terminal of battery 76 through a resistor R. Each of the make contacts 2 of relays RA, RB, and RC is connected to one end of the winding of relay AL which is not connected to the negative terminal of the battery.

When the relays RA, RB and RC are in their deenergized positions, the condensers XA, XB, and XC are charging, since they are directly connected in parallel across the battery 76. However, when one of these relays operates, the charging circuit of the associated condenser is broken at the break contact 2 of the relay, while the make contact 2 connects this condenser across the winding of the relay AL.

The lowermost card of the stack 22, in leaving the stack under control of the roller 37, will first pass between contacts CA, thus releasing the relay RA. By this time the motor 18 has come up to speed and the contact 1 of centrifugal switch CF has opened to break the circuit from the battery through the relay AL, but the condenser XA is immediately connected across the relay AL to hold it in operation. The card then travels towards the contacts CB, and when it passes between these contacts, the circuit for relay RB is broken. The release of relay RB connects the condenser XB across the relay AL to continue to hold it in its operating condition. By this time the rear corner 57*a* of the card may have reached the switch CA, and since this corner is cut away, the switch will again close, thereby operating the relay RA and permitting the condenser XA to charge again. The card will now reach the switch CC which will operate relay RC in a corresponding manner.

As long as the cards are moving through the switches CA, CB and CC, the condensers XA, XB, and XC are continually being charged and applied to the relay AL to hold it operated. If the movement of the cards through the contacts CA, CB, and CC should stop, any of the three condensers which is holding the relay AL will soon discharge through the relay and the relay will release, thus closing the contacts thereof which completes the circuit through the bell 82 and thus provides an audible signal that something is wrong in the mechanism.

The contacts CA, CB, and CC may be spaced in the slot 11, as desired. They should, however, be so spaced that any card located between the stack and the outlet of the recording head will open at least one of the contacts and thus release the associated relay. The cut-away corner 57*a* of the card permits a relay to operate momentarily when the end of the card passes the associated switch even though the cards follow one another closely.

When all the cards have left the stack, the contacts CDC will close, and when the cards have passed through the contacts CA, CB and CC these contacts will also be closed. This closes the circuit from the positive terminal of the battery 76, through contacts CDC, make contacts 1 of relays RA, RB, and RC, which are connected in series, the winding of release relay REL, to the negative terminal of the battery. This will operate the relay REL whose contacts 1 will close a circuit leading to the control circuit in the housing 72 to inform the control circuit that the cards have all passed through the reading and recording heads, since a card separating any of the contacts CA, CB, and CC will release the associated relay RA, RB or RC and thus break the circuit through the relay REL and prevent its operation.

When the control circuit in the housing 72 receives the signal that all cards have been passed through the apparatus, the circuit (not shown) for the return of the tray is operated and the tray starts to move back into the cabinet 67. When the tray has passed under the member 30, a circuit is closed by means of a suitable switch 83 to connect a source of potential 84 with the relay DR. The operation of relay DR opens the break contact 1 thereof which releases the solenoid SOL and permits the member 30 to swing downwardly by its own weight until the lower surface 33 thereof reaches the surface of the base 2. The opening of the contacts LOC caused by the return movement of the member 30 will break the circuit through the driving motor 18 and release the relays RA, RB, and RC, which in turn will release the relay REL. Opening of contacts LOC will also break the locking circuit of the relay DO, causing this relay to release and stop the motor M2. The cam 78 then is returned to its normal position by the spring 79.

With the tray returned to the cabinet 67, the mechanism is ready to receive another tray and repeat the operations already explained.

Various modifications of the invention may be used without departing from the spirit thereof and we do not therefore wish to limit ourselves except by the limitations contained in the appended claims.

What we desire to secure by Letters Patent is:

1. A memory system comprising a support, record transfer means mounted on said support for transferring records between said means and a card, a movable tray adapted to hold a stack of cards, guide means in said support adjacent said record transfer means adapted to receive said tray, whereby said tray may be inserted into said support, means attached to said support and controlled by the relative movement between said support and said tray for removing a stack of cards from said tray and feeding them in succession past said record transfer means, and means for replacing said cards in said tray after they have passed said record transfer means.

2. A memory system, according to claim 1, in which there are a plurality of the trays, and further comprising a housing for said trays, the support for the record transfer means being mounted on said housing at a particular location, and means controlled by the movement of a tray into the guide means of said support for initiating the operation of said card feeding means.

3. A memory system, according to claim 2, further comprising means controlled by the record transfer means for automatically initiating the return of the tray into the housing after all the cards in said tray have passed said record transfer means.

4. A memory system, according to claim 3, in which the means attached to the support for removing a stack of cards from the tray comprises a stack lifting member pivotally mounted in the guide means of said support, said stack lifting member being provided with a cam surface on its lower side and being tapered towards the end thereof facing the tray when the tray is inserted in said guide means, the pivot of said stack lifting means being at the opposite end of said means from said tapered edge, means for normally maintaining said stack lifting member in a position which will permit said tapered edge to pass under a stack of cards carried by a tray when the tray is inserted in said guide means, cam means on said tray arranged to cooperate with the cam surface on said stack lifting member, so as to rotate said stack lifting member about its pivot and thus lift the stack of cards to a position above said tray and aligned with the record transfer means, said card feeding means mounted on said stack lifting member and adapted to engage the lowermost card of said stack of cards, said means for initiating the operation of said card feeding means operable upon movement of said stack lifting member when said lifting member reaches the uppermost position of its movement to cause successive cards beginning with the lowermost card in the stack to pass through said record transfer means, the relative position of the reading means and tray when the cards have been lifted by said stack lifting member being such that said tray extends beyond said card reading means, and card guiding means mounted on said support for guiding a card passing out of said record transfer means back into said container in the same order it originally occupied in said stack.

5. A memory system, according to claim 4, in which each card is provided with a plurality of parallel tracks extending in the direction of movement of the card, and in which the record transfer means comprises a plurality of sensing members, one for each track on the card and adapted to read the information contained on said track as said card is moved through said record transfer means, and means to maintain said card in accurately spaced relation with respect to said sensing members as said card passes through said record transfer means.

6. A memory system, according to claim 5, further comprising first switch means on the stack lifting member adapted to be controlled by the presence of a card on said stack lifting member, second switch means in said record transfer means adapted to be controlled by the presence of a card therein, and means controlled by the cooperative operation of both of said switch means for initiating the return of the tray into the housing after all of the cards have been passed through said record transfer means.

7. A memory system, according to claim 6, in which the record transfer means comprise magnetic sensing members and the cards have a surface of magnetic material with the information stored by magnetized elements on tracks thereof, said tracks in register with said sensing members.

8. A memory system, according to claim 1, in which the means attached to the support for removing a stack of cards from the container comprises a stack lifting member pivotally mounted in the guide means of said support, said stack lifting member being provided with a cam surface on its lower side and being tapered towards the end thereof facing the tray when the tray is inserted in said guide means, the pivot of said stack lifting member being at the opposite end of said member from said tapered edge, means for normally maintaining said stack lifting member in a position which will permit said tapered edge to pass under a stack of cards carried by a tray when said tray is inserted in said guide means, cam means on said tray arranged to cooperate with the cam surface on said stack lifting member, so as to rotate said stack lifting member about its pivot and thus lift the stack of cards to a position above said tray and aligned with said record transfer means, card driving means mounted on said stack lifting member and adapted to engage the lowermost card of said stack of cards, means controlled by the movement of said stack lifting means for initiating the driving of said card driving means when said lifting member reaches the uppermost position of its movement to cause successive cards beginning with the lowermost card in the stack to pass through said record transfer means, the relative position of said record transfer means and tray when the cards have been lifted by said stack lifting member being such that said tray extends beyond said record transfer means, and card guiding means mounted on said support for guiding a card passing out of said record transfer means into said tray.

9. A memory system, according to claim 8, in which each card is provided with a plurality of parallel tracks extending in the direction of movement of the card, and in which the record transfer means is a reading means and comprises a plurality of sensing members, one for each track on the card, and adapted to read the information contained on said track as said card is moved through said reading means, and means to maintain said card in accurately spaced relation with respect to said sensing members as said card passes through said reading means.

10. A memory system, according to claim 9, further comprising means for maintaining the stack lifting member in its uppermost position until the tray passes beyond said member in its return trip into the housing.

11. A memory system, according to claim 10, further comprising an alarm circuit, a pair of contacts adjacent the record transfer means adapted to be normally closed and to be separated when a card is passing said contacts, and means controlled by the feeding means for energizing said alarm circuit a predetermined time after said contacts are closed.

12. A memory system, according to claim 11, in which there are a plurality of interconnected pairs of contacts and the means for energizing the alarm circuit is operable a predetermined time after all said contacts are closed.

13. A memory system, according to claim 1, further comprising an alarm circuit, a pair of contacts adjacent the record transfer means adapted to be normally closed and to be separated when a card is passing said contacts, and means controlled by the feeding means for energizing said alarm circuit a predetermined time after said contacts are closed.

14. A memory system, according to claim 1, in which there are a plurality of trays, and further comprising a housing for said trays, the support for the record transfer means being mounted on said housing at a particular location, means controlled by the movement of a tray into the guide means of said support for initiating the operation of the card feeding means, means controlled by the record transfer means for automatically initiating the return of the tray into the housing after all the cards in said tray have passed said record transfer means, and means for maintaining the stack lifting member in its uppermost position until the tray passes beyond said member in its return trip into said housing.

15. A memory circuit, according to claim 14, further comprising an alarm circuit, a pair of contacts adjacent the record transfer means adapted to be normally closed and to be separated when a card is passing said contacts, and means controlled by the feeding means for energizing said alarm circuit a predetermined time after said contacts are closed.

16. A memory system, according to claim 1, in which the means for removing the stack of cards from the tray comprises means for lifting said stack out of the tray and means controlled by the relative movement of said tray and the support for operating said stack lifting means, and further comprising means initiated by the stack lifting means when it has lifted said stack a predetermined distance for taking over the control of said stack lifting means and further lifting it so as to align the lowermost card of the stack with the record transfer means and maintaining it in such position independently of the movement of said tray.

17. A memory system, according to claim 1, further comprising means for directing a stream of air against one side of each card as it passes said record transfer means for holding said card accurately in position therein.

18. A memory system, according to claim 1, in which each card is provided with a plurality of parallel tracks extending in the direction of movement of the card and in which the record transfer means comprises a plurality of sensing members, one for each track on the card and adapted to read the information contained on said track as said card is moved through said record transfer means, and means for directing air under pressure against the opposite side of said card to maintain said card in accurately spaced relation with respect to said sensing members as said card passes through said record transfer means.

19. A memory system comprising record transfer means, a magazine for storing a plurality of record media, means for moving said media out of said magazine to an operative position with respect to said record transfer means, means for moving said magazine to a record media receiving position and means responsive to the movement of said media to return said media to said magazine.

20. A memory system comprising record transfer means, a movable magazine for storing a plurality of record media in a predetermined order, means under control of the movement of said magazine for removing said media therefrom, means for sequentially moving said record media in operative relation with said record transfer means, means for moving said magazine to a record media receiving position and means for returning said record media to said magazine in the same predetermined order.

References Cited in the file of this patent

UNITED STATES PATENTS 2,564,089 Williams et al. ---------- Aug. 14, 1951